US010662030B2

(12) United States Patent
Stine et al.

(10) Patent No.: US 10,662,030 B2
(45) Date of Patent: May 26, 2020

(54) UNIT OR ONE OR MORE MEMBERS FOR AN ELEVATOR COMPONENT THAT ALLOWS THE ELEVATOR COMPONENT TO WITHSTAND A SEISMIC EVENT OR OTHER SIGNIFICANT FORCE GENERATING EVENT

(71) Applicant: ELEVATOR SAFETY COMPANY, Owings Mills, MD (US)

(72) Inventors: Tyler Michael Stine, Clear Spring, MD (US); Jeffrey Lachica Geroso, Baltimore, MD (US); Andrew James Laughton, Ellicott City, MD (US)

(73) Assignee: ELEVATOR SAFETY COMPANY, Owings Mills, MD (US)

( * ) Notice: Subject to any disclaimer, the term of this patent is extended or adjusted under 35 U.S.C. 154(b) by 0 days.

(21) Appl. No.: 15/996,441

(22) Filed: Jun. 2, 2018

(65) Prior Publication Data

US 2019/0367329 A1 Dec. 5, 2019

(51) Int. Cl.

*F16M 13/00* (2006.01)
*B66B 7/02* (2006.01)
*B66B 19/00* (2006.01)
*B66B 7/04* (2006.01)

(52) U.S. Cl.

CPC .............. *B66B 7/027* (2013.01); *B66B 19/00* (2013.01); *B66B 7/04* (2013.01)

(58) Field of Classification Search

USPC ............... 248/220.21, 220.22, 223.41, 224.8
See application file for complete search history.

(56) References Cited

U.S. PATENT DOCUMENTS

| | | | | |
|---|---|---|---|---|
| 5,732,916 | A * | 3/1998 | Gordon | B60K 37/04 248/220.31 |
| 6,698,138 | B1 * | 3/2004 | Lin | E05D 15/0639 16/105 |
| 8,251,186 | B2 | 8/2012 | Webster et al. | |
| 9,708,161 | B2 | 7/2017 | Geroso et al. | |
| 10,145,166 | B2 * | 12/2018 | Berger | E06B 3/4663 |
| 10,414,630 | B2 * | 9/2019 | Geroso | F16M 13/02 |

(Continued)

OTHER PUBLICATIONS

U.S. Appl. No. 15/624,940 entitled "Universal Adapter Assembly for Connecting a Roller Guide to a Frame of an Elevator Car".

*Primary Examiner* — Steven M Marsh
(74) *Attorney, Agent, or Firm* — Merek, Blackmon & Voorhees, LLC

(57) ABSTRACT

A unit or one or more members that allows an elevator component (e.g., frame of elevator car or a surface of a counterweight) to withstand a force generated by a significant force generating event (e.g., earthquake). The unit prevents an elevator guide member (e.g., roller guide or slide guide) from altering its operational position relative to a rail of an elevator when the elevator is subjected to a seismic or other significant force generating event. Preferably, the unit connects a guide member to a component of an elevator where a hole pattern in the component of the elevator is different from an existing hole pattern of the guide member The unit is preferably configured such that when the elevator is subjected to a significant force generating event the operational position of the guide member relative to a rail of the elevator remains unchanged.

21 Claims, 10 Drawing Sheets

(56) References Cited

U.S. PATENT DOCUMENTS

| | | | | |
|---|---|---|---|---|
| 2010/0258689 | A1* | 10/2010 | Hufen | E05F 3/10 248/205.4 |
| 2015/0198871 | A1* | 7/2015 | Piraino | F16M 13/02 248/309.1 |
| 2017/0057785 | A1 | 3/2017 | Geroso et al. | |

* cited by examiner

UNIT OR ONE OR MORE MEMBERS FOR AN ELEVATOR COMPONENT THAT ALLOWS THE ELEVATOR COMPONENT TO WITHSTAND A SEISMIC EVENT OR OTHER SIGNIFICANT FORCE GENERATING EVENT

FIELD OF THE INVENTION

The present invention is directed to a unit or one or more members that allows an elevator component to withstand a force generated by a seismic event or other significant force generating event. The elevator component can be an elevator car or a counterweight. More specifically, the unit or one or more members prevent an elevator guide member mounted or otherwise connected to an elevator component from altering its operational position relative to a rail of an elevator when the elevator is subjected to a seismic or other significant force generating event. In a most preferred embodiment, the unit takes the form of an adapter assembly for connecting a guiding member (e.g., roller guide or slide guide) to a component of an elevator where a hole pattern in the component of the elevator is different from an existing hole pattern of the guiding member.

BACKGROUND OF THE INVENTION

Typically, an elevator car travels along a pair of opposing guide rails located in a shaft or hoist way of a building structure. It is customary to employ four guides members (e.g., roller guides or slide guides) per elevator car to guide the elevator car along the guide rails as the car is moved in a shaft or hoist way. It is equally customary to employ guide members (e.g., roller guides or slide guides) for the counterweight for a given elevator car.

Two of the guide members are secured to the upper portion of the elevator car or a corresponding counterweight in such a manner as to engage the corresponding guide rail. The remaining two guides members are secured to the lower portion of the elevator car or a corresponding counterweight in a similar manner to engage the corresponding guide rail. The guide members may be roller guides having a plurality of rollers that engage and travel along the corresponding guide rail. Typically, each roller guide includes three or six rollers. The present invention is not limited to elevator roller guides having a particular number of rollers or guide members that have rollers. Rather, the present invention can be used with elevator roller guides having differing numbers of rollers or guide members that do not have any rollers (e.g., slide guides).

Guide members typically include a base having a fixed pattern of openings through which bolts extend to mount or connect the guides members to the corresponding component of the elevator (e.g., frame of an elevator car or component of a counterweight). The pattern of openings in the base of different guides members typically differ, i.e., no standard exists for the pattern of openings in the base of the differing types of guide member.

Over time or with advancement in guide members it becomes necessary to replace the existing guide member. This replacement process typically requires an installer to measure the existing hole pattern of the elevator component whose guide member is to be replaced. If it is determined that the existing hole pattern of the elevator component whose guides members are to be replaced differs from the hole pattern of the replacement guide member, then the installer must fabricate an adapter plate that will compensate for the two differing hole patterns. The above process of measuring and comparing the existing hole pattern of the elevator component to the hole pattern of the replacement guide member and then fabricating an adapter plate specific to the replacement guide member is extremely time consuming.

In an effort to overcome the aforementioned time-consuming process, adapter kits/mounting assemblies have been developed one of which is disclosed in U.S. Pat. No. 8,251,186 and another of which is disclosed in U.S. Pat. No. 9,708,161. However, previously developed adapter kits/mounting assemblies include one or more adjustable/moveable components which when the elevator is subjected to a seismic or other significant force generating event will cause the operational position of the guide member relative to a rail of the elevator to be altered/changed. As such, the previously known adapter kits/mounting assemblies cannot be used in geographical areas where the elevator component may be subjected to a seismic or other significant force generating event.

Hence, there exists a significant need for a device that can readily allow a guide member having a hole pattern different from the hole pattern of an elevator component to be connected to the elevator component wherein the device is configured such that when the elevator is subjected to a seismic or other significant force generating event the operational position of the guide member relative to a rail of the elevator remains unchanged.

Further, there exists a significant need for a guide member that can compensate for differences in hole patterns without any intermediate element or elements mounted between the base of the guide member and the surface of the elevator component that the base of the guide member is directly mounted on.

OBJECTS AND SUMMARY OF THE INVENTION

An object of the present invention is to provide a novel and unobvious device for a component of an elevator.

Another object of a preferred embodiment of the present invention is to provide a device for a component of an elevator where the hole pattern of the elevator component differs from the hole pattern in the base of a guide member without the need for an installer to fabricate an adapter plate after determining that the existing hole pattern in the component differs from the existing hole pattern in a guide member wherein the device is configured such that when the elevator component is subjected to a seismic event (e.g., earthquake) or other significant force generating event the operational position of the guide member relative to a rail of the elevator remains unchanged.

A further object of a preferred embodiment of the present invention is to provide a device for a guide member wherein the device includes one or more locking/anti-movement/anti-adjustment members that do not hamper the adjustability of the device as the device is being installed to connect a guide member to an elevator component while preventing the operational position of the guide member relative to a rail of an elevator from changing once the one or more locking/anti-movement/anti-adjustment members are installed even when the elevator is subjected to a seismic event or other significant force generating event.

Yet another object of a preferred embodiment of the present invention is to provide a device having a plurality of members at least one of which is adjustable to allow a guide member having a hole pattern different from the hole pattern of an elevator component to be connected to the elevator component wherein the adapter assembly further includes one or more locking or other securement/anti-movement devices that when installed prevent adjustment/movement of the adjustable member so that even when the elevator experiences a predetermined force (e.g., a force imparted by a seismic event) the operational position of the guide member relative to a rail of the elevator remains unchanged.

Yet still another object of a preferred embodiment of the present invention is to provide a device having a plurality of members at least one of which is adjustable to allow a guide member having a hole pattern different from the hole pattern of the corresponding elevator component to be connected to the corresponding elevator component wherein the device is configured such that when the elevator is subjected to a seismic event (e.g., earthquake) or other significant force generating event the operational position of the guide member relative to a rail of the elevator remains unchanged without altering or otherwise modifying any corresponding guide member.

A further object of a preferred form of the present invention is to provide a device having one or more locking or other securement/anti-movement devices that are easily installed to maintain one or more adjustable members of a mounting assembly in a first operational position even when the elevator is subjected to a force imparted by a seismic event or other significant force generating event.

Still another object of a preferred embodiment of the present invention is to provide a device with a locking/anti-adjustment/anti-movement body wherein the locking body includes an opening for receiving a fastener extending in an elongated slot formed in a support member of a mounting assembly or a base of a guide member and the locking body is configured to provide a plurality of optional points for securing the locking body to the support member or the base or the guide member so that the fastener cannot slide along a longitudinal axis of the elongated slot.

Yet still another object of a preferred embodiment of the present invention is to provide a device with a locking/anti-adjustment/anti-movement plate wherein the locking plate includes an opening for receiving a fastener extending in an elongated slot formed in a support member or a base of an elevator guide member (e.g., roller guide or slide guide), a first set of a plurality of optional points for securing the locking plate to the support member or component of the elevator so that the fastener cannot slide along a longitudinal axis of the elongated slot and a second set of a plurality of optional points for securing the locking plate to the support member or a base of the elevator guide member so that the fastener cannot slide along a longitudinal axis of the elongated slot and wherein a user can switch between the first set of a plurality of optional points and the set of a plurality of optional points merely by flipping the locking plate over.

Another object of a preferred embodiment of the present invention is to provide a device with a locking/anti-adjustment/anti-movement plate wherein the locking plate includes an opening for receiving a fastener extending in an elongated slot formed in a support member or a base of a guide member, a first set of a plurality of optional points for securing the locking plate to the support member or a base of a guide member so that the fastener cannot slide along a longitudinal axis of the elongated slot, a second set of a plurality of optional points for securing the locking plate to the support member or a base of a guide member so that the fastener cannot slide along a longitudinal axis of the elongated slot and means for allowing a user to readily distinguish the first set of a plurality of optional points from the second set of a plurality of optional points.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, a preferred embodiment of the present invention is directed to an apparatus for connecting an elevator guide member to an elevator component of an elevator where a hole pattern in the elevator component is different from a hole pattern of the guide member. The apparatus includes a mounting assembly configured to mount the guide member to a component of an elevator where a hole pattern in the elevator component is different from a hole pattern of the guide member. The mounting assembly includes at least one support member, at least one elongated opening and at least one fastener configured to extend through the at least one elongated opening. An anti-sliding member is connected to the mounting assembly. The anti-sliding member is configured to maintain the at least one fastener in a predetermined operational position in the at least one elongated opening when the mounting assembly and the guide member are mounted in an operational position on the elevator component even when the mounting assembly experiences a predetermined force which would otherwise cause the at least one fastener to slide along a longitudinal axis of the at least one elongated opening.

Another preferred embodiment of the present invention is directed to an adapter assembly for connecting a guide member to a component of an elevator where a hole pattern in the component of the elevator is different from a hole pattern of the guide member. The adapter assembly includes an adjustable mounting assembly for mounting a guide member on a component of an elevator in a first operational position. The adjustable mounting assembly is configured to mount the guide member to the component of the elevator where a hole pattern in the component of the elevator is different from a hole pattern of the guide member. The mounting assembly includes at least one support member having a hole pattern corresponding to a hole pattern formed in a base of a guide member so that the base of the guide member can be secured to the at least one support member using a set of first fasteners extending through the hole pattern in the at least one support member and the hole pattern in the base of the guide member. A locking member. The locking member when installed in an operational position is configured to maintain the roller guide in the first operational position when the elevator experiences a seismic event.

A further preferred embodiment of the present invention is directed to an adapter assembly for connecting a guide member to a component of an elevator car where a hole pattern in the component of the elevator is different from a hole pattern of the guide member. The adapter assembly includes an adjustable mounting assembly for mounting a guide member on a component of an elevator in a first operational position. The adjustable mounting assembly is configured to mount the guide member to the component of the elevator where a hole pattern in the component of the elevator is different from a hole pattern of the guide member. The mounting assembly includes at least one upper support member having a hole pattern corresponding to a hole pattern formed in a base of the guide member so that the base of the guide member can be secured to the at least one upper support member using a set of first fasteners extending through the hole pattern in the at least one support member and the hole pattern in the base of the guide member. The mounting assembly further includes at least one lower support member. The at least one lower support member is configured to connect the at least one upper support member to the component of the elevator. A locking member. The locking member when installed in an operational position is configured to prevent movement of the at least one upper member along a first axis when the mounting assembly experiences a predetermined force which would otherwise cause the at least one upper support member to move along the first axis. The locking member is further configured to prevent movement of the at least one lower support member along a second axis when the mounting assembly experiences a predetermined force which would otherwise cause the at least one lower support member to move along the second axis, and wherein the first axis extends perpendicular to the second axis.

Still a further preferred embodiment of the present invention is directed to an apparatus for connecting an elevator guide member to an elevator component of an elevator where a hole pattern in the elevator component is different from a hole pattern of the guide member. The apparatus includes at least one elongated slot formed in one of a base of a guide member or a support member configured to allow a position of the guide member to be adjusted relative to the elevator component to allow the base of the guide member to be connected to the elevator component where a hole pattern in the elevator component is different from a hole pattern of the guide member. An anti-sliding member is configured to maintain the at least one fastener in a predetermined operational position in the at least one elongated opening when in an operational position even when an elevator is subject to a force which would otherwise cause the at least one fastener to slide along a longitudinal axis of the at least one elongated opening.

DETAILED DESCRIPTION OF THE PREFERRED EMBODIMENTS OF THE INVENTION

The preferred forms of the invention will now be described with reference to FIGS. 1-11. The appended claims are not limited to the preferred forms and no term and/or phrase used herein is to be given a meaning other than its ordinary meaning unless it is expressly stated that the term and/or phrase shall have a special meaning.

FIGS. 1-11

Figure 1:
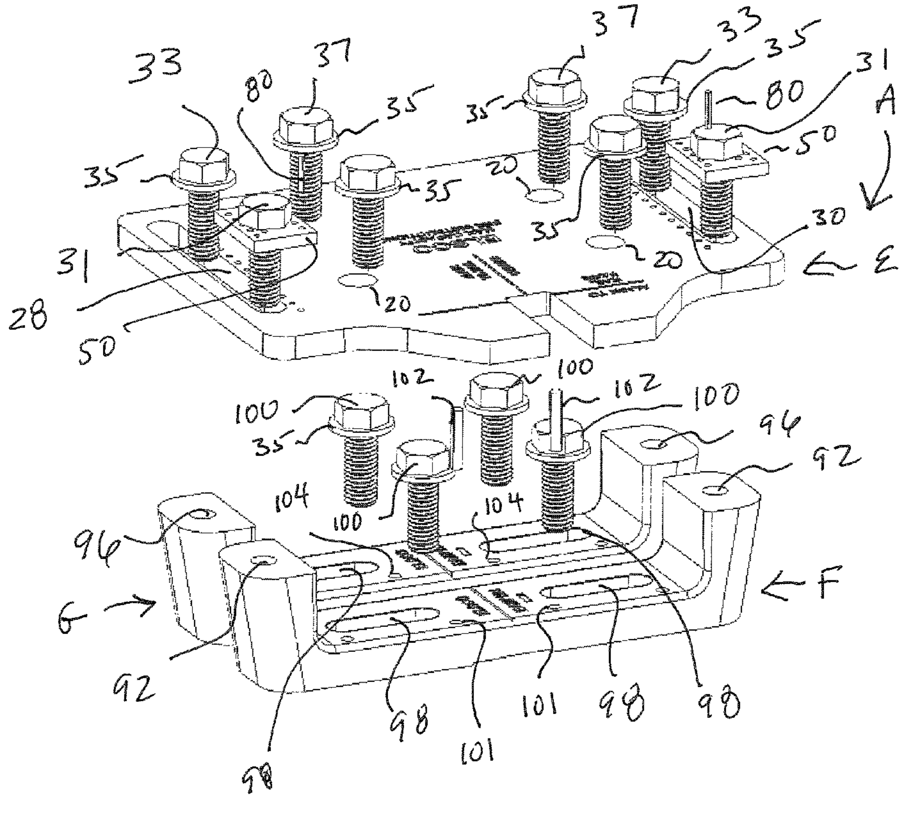
FIG. 1 is an exploded perspective view of a mounting assembly formed in accordance with a preferred embodiment of the present invention.
Figure 2:
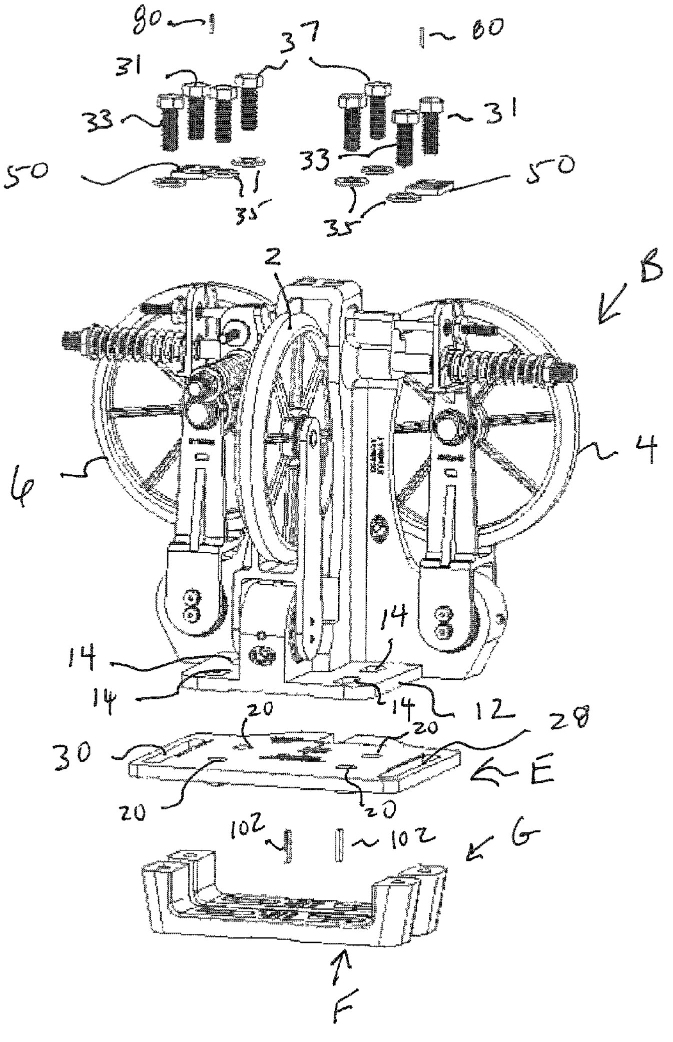
FIG. 2 is an exploded perspective view of the mounting assembly of FIG. 1 and one of many different roller guides that the mounting assembly can secure to a frame of an elevator car.
Figure 3:
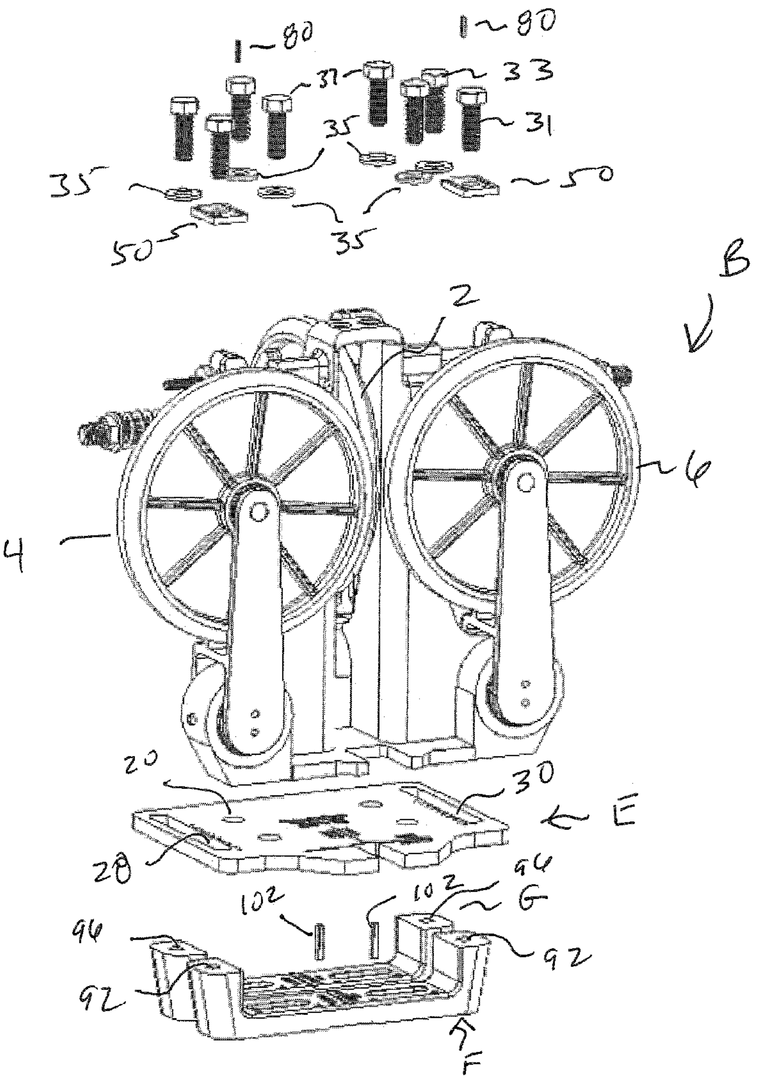
FIG. 3 is an exploded perspective view of the components of FIG. 2 taken from a different vantage point from that of FIG. 2.

Referring to FIGS. 1 to 11, a preferred form of adapter assembly A is illustrated in one of many possible configurations. One of many different types of roller guides that the adapter assembly A can be used with is shown in FIGS. 2 and 3. Roller guide B, as shown in FIGS. 2 and 3, is of the type disclosed in U.S. Pat. No. 7,562,749. It is important to note that the present invention is not limited to use with roller guide B. Rather, the adapter assembly A can be used with any roller guide.

While a roller guide B is shown in the preferred embodiment as having a plurality of rollers any other type of elevator guide member can be used including but not limited a guide member that does have any rollers (e.g. slide guides).

Referring to FIGS. 2 and 3, roller guide B includes rollers 2, 4 and 6. Roller 2, when the roller guide B is installed/connected to frame C (see FIG. 8) of an elevator car, engages and rides along the front face 8 of rail D (see FIG. 9). Roller 2 is able to pivot toward and away from front face 8 of rail D to compensate for irregularities in the front face 8 that may exist. Rollers 4 and 6, when the roller guide B is installed/connected to frame C (see FIG. 8) of an elevator car, engage and ride along the corresponding side face 10 of rail D (see FIG. 9). Rollers 4 and 6 are able to pivot toward and away from the corresponding side face 10 of rail D to compensate for irregularities in the corresponding side face 10 that may exist.

Roller guide B includes a base 12 having four bolt holes 14 forming a specific bolt hole pattern. Bolt holes 14 may form a rectangular bolt hole configuration or other suitable configuration. As previously explained, when the bolt hole pattern formed in base 12 does not match the bolt hole pattern of the frame of an elevator car or a component of a counterweight, additional time-consuming steps would be required including fabricating an adapter plate after taking the necessary measurements of the exiting bolt hole pattern on the elevator component (e.g., frame of elevator car or a component of a counterweight) and the existing bolt hole pattern of the roller guide. The preferred form of the present invention eliminates the above time-consuming steps.

Figure 8:
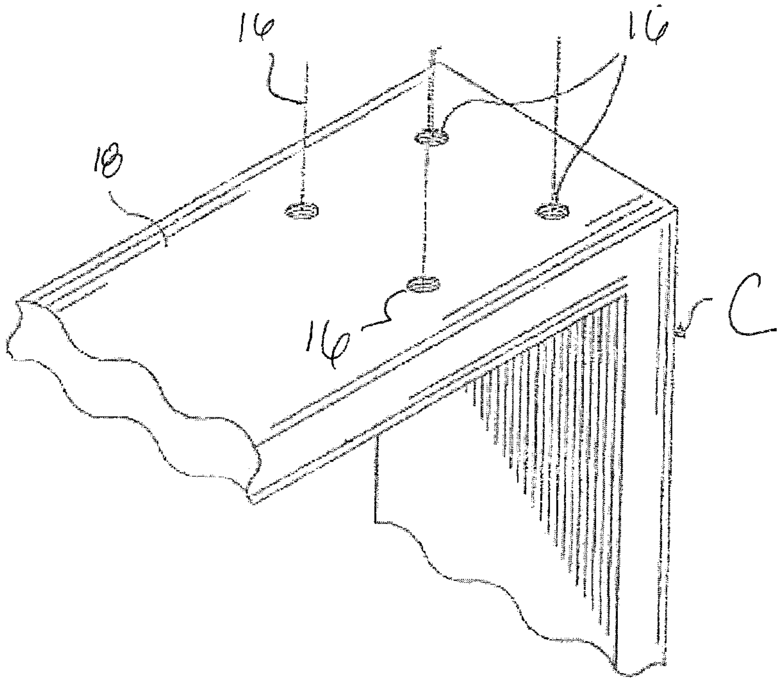
FIG. 8 is a fragmentary perspective view of a frame of an elevator car.
Figure 9:
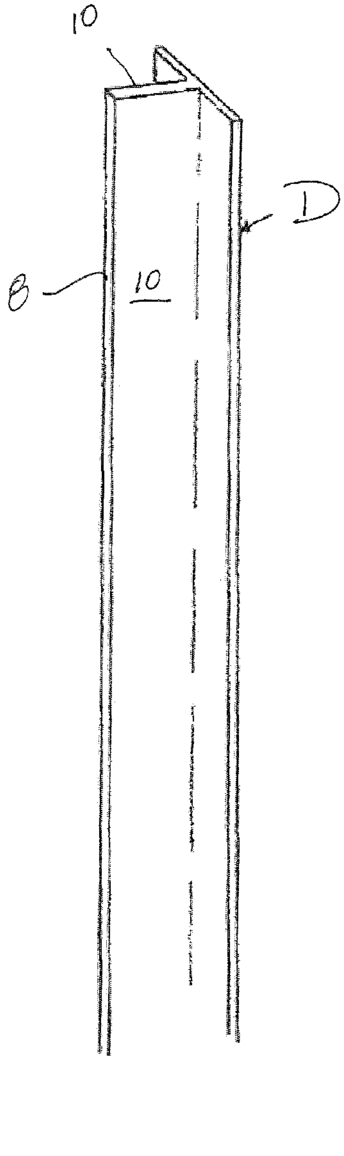
FIG. 9 is a fragmentary perspective view of a rail of an elevator.

Referring to FIG. 8, the original bolt hole pattern formed by bolt holes 16 in a horizontally extending upper member 18 of frame C may not match the bolt hole pattern formed by bolt holes 14 in base 12 of a new roller guide that is to replace an existing roller guide previously connected to the frame of an elevator car. Alternatively, one or more bolts holes 16, due to deterioration, may no longer be useable requiring one or more new bolts holes to be drilled into frame C which will create a hole pattern that does not correspond to a hole pattern of an existing roller guide or the hole pattern of a replacement roller guide. Adapter assembly A, in its most preferred form, is specifically designed to be able to accommodate the above scenarios to connect roller guide having the non-matching hole pattern to the frame C. While FIG. 8 illustrates the elevator component to which the guide member is connected to by the adapter assembly A is a frame of an elevator car, the adapter assembly A can be used to connect a guide member to a component of a counterweight.

In addition, the adapter assembly A is configured to prevent the operational position of roller guide B relative to the front face 8 of rail D from being altered or changed even when the adapter assembly A and/or elevator car is subjected to a force imparted by a seismic event (e.g., earthquake) or other significant force exerting event. In one preferred form, adapter assembly A is able to withstand the force exerted by a seismic event without altering or otherwise modifying in any way roller guide B. The details of a preferred form of adapter assembly A will now be discussed.

Referring to FIGS. 1 to 7, adapter assembly A includes an upper mounting or support member E and lower mounting or support members F and G. It will be readily appreciated that a single large lower support member could be used in place of lower mounting members F and G.

Figure 5:
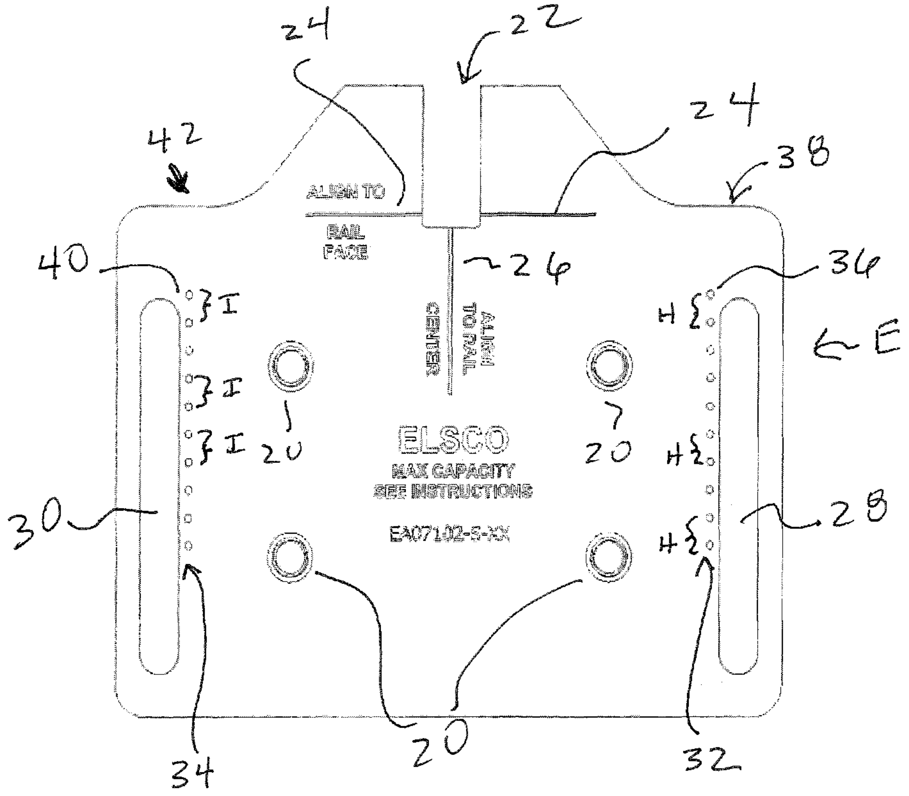
FIG. 5 is a plan view of the a preferred upper support member of the mounting assembly depicted in FIG. 1.

Referring to FIG. 5, support member E includes a bolt hole pattern formed by bolt holes 20 that is the same as the bolt hole pattern formed by bolt holes 14 formed in base 12 of roller guide B. Again, roller guide B may be a replacement roller guide or an existing roller guide that no longer matches the useable bolt hole pattern formed in frame C due to deterioration of one or more bolt holes in frame C. Preferably, support member E has planar upper and lower surfaces and a uniform thickness. Bolt holes 20 and bolt holes 14 can be formed such that no nut is necessary to secure base 12 to support member E with fasteners extending into holes 20 of support member E and holes 14 of base 12. Alternatively, nuts can be used.

Preferably, support member E has a notch 22 (as seen in FIG. 5) configured to receive at least a forwardmost portion of rail D. Alignment indicia/markings may be provided on the uppermost surface of support member E to allow a user to readily align the support member E relative to rail D which in turn will orient any roller guide attached to support member E in an optimal position. Alignment indicia/markings 24 may be provided on opposite sides of notch 22 to identify where the front face 8 of rail D is to be oriented relative to support member E. Alignment indicia/markings 26 may be provided to identify where a center of rail D is to be oriented relative to support member E.

Preferably, support member E has two elongated slots 28 and 30 extending perpendicular or substantially perpendicular to front face 8 of rail D. In the most preferred form, each of the elongated slots 28 and 30 receives two fasteners 31 and 33, i.e., fasteners 31 and 33 extend through each of slots 28 and 30. However, where only one single lower support member is used, only one fastener need extend through each of elongated slots 28 and 30. Preferably, fasteners 31 and 33 are identical.

Preferably, a conventional washer 35 is used with each of fasteners 33 and each of the fasteners 37 used to secure base 12 to upper support member E.

Preferably, support member E includes a first set of openings 32 positioned adjacent elongated slot 28 and a second set of openings 34 positioned adjacent elongated slot 30. The spacing H between adjacent openings 32 is preferably the same as the spacing I between adjacent openings 34. Preferably, spacing H and spacing I are each 0.04375 inches. Further, opening 36 of the first set of openings 32 which is closest to a front face 38 of support member E is spaced equidistant to that of opening 40 of the second set of openings 34 which is closest to a corresponding front face 42 of support member E.

Preferably, an axis extending through the center of each of the first set of openings 32 extends parallel or substantially parallel to a longitudinal axis extending through elongated slot 28. Preferably, an axis extending through the center of each of the second set of openings 34 extends parallel or substantially parallel to a longitudinal axis extending through elongated slot 30. The first set of openings 32 and the second set of openings 34 provide a plurality of optional points that a corresponding locking/anti-sliding/anti-adjustment/anti-movement member 50 can be connected to support member E. This allows the final operational position of fasteners 31 and 33 to vary to meet the particular needs of the bolt hole pattern of roller guide and the bolt hole pattern of the frame of an elevator car.

Referring to FIGS. 1 to 4 and FIG. 6, the locking/anti-sliding/anti-adjustment/anti-movement member 50 preferably takes the form of a plate having a substantially uniform thickness. The thickness of member 50 is preferably less than the thickness of support member E. However, the configuration of member 50 can be readily modified. For example, a locking/anti-sliding/anti-adjustment/anti-movement member 52 having a circular configuration (See FIG. 7) with a central opening 53 and a plurality of openings 55 offset from opening 53 can be utilized in place of the rectangular configuration of member 50.

Regardless of the geometric configuration of the locking/anti-sliding/anti-adjustment/anti-movement member 50, the locking/anti-sliding/anti-adjustment/anti-movement member 50 is preferably configured to prevent relative movement of the roller guide B and the upper support E when a force (e.g., a force exerted by a seismic event or other significant force generating event) is exerted on the elevator car which would exceed the force exerted by the head of fasteners 31 and 33 on support member E which in turn would cause fasteners 31 and 33 to slide or otherwise move in the corresponding elongated slot formed in support E.

Referring to FIGS. 1 to 4 and 6, the locking/anti-sliding/anti-adjustment/anti-movement members 50 takes the form of a plate which is substantially rectangular in shape and has a uniform thickness. However, the configuration of member 50 can be readily modified as desired one example of which is shown in FIG. 7.

Figure 4:
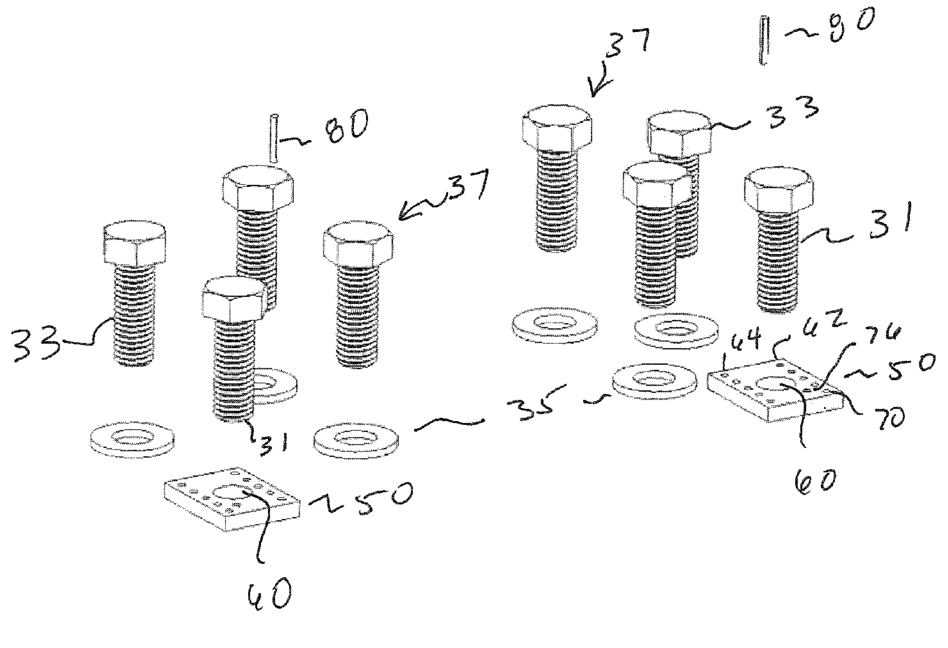
FIG. 4 is an exploded view of some of the components of the preferred mounting assembly depicted in FIG. 1.
Figure 6:
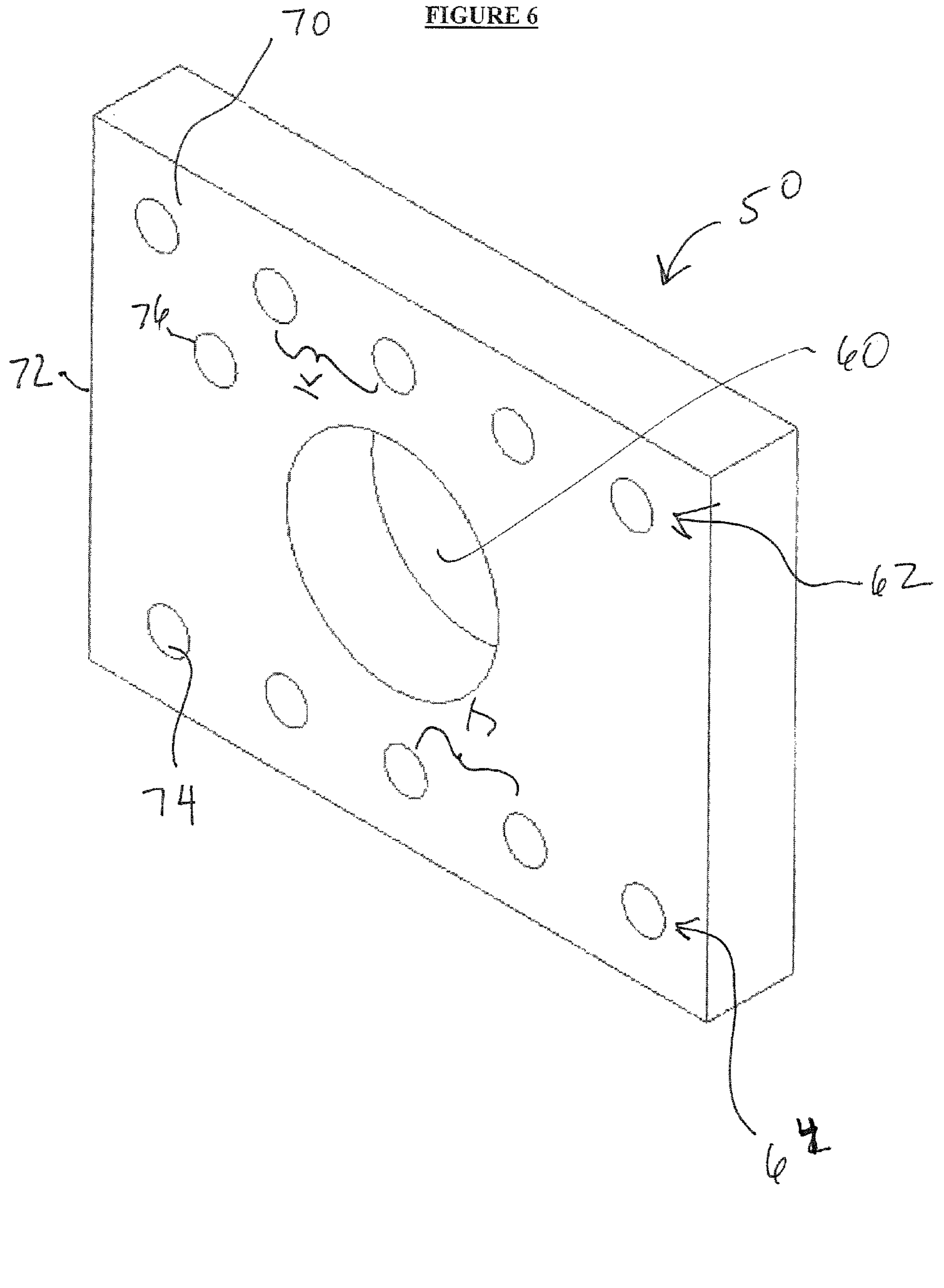
FIG. 6 is a perspective view of a preferred locking/anti-sliding/anti-adjustment/anti-movement member of the mounting assembly depicted in FIG. 1.
Figure 7:
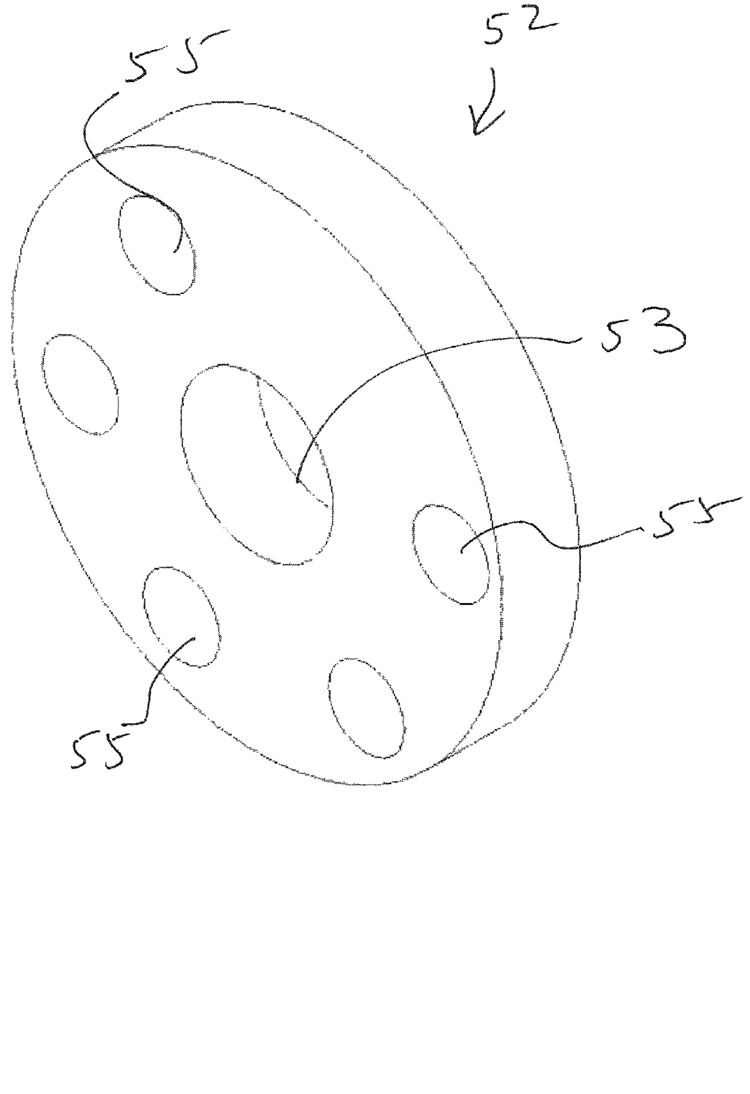
FIG. 7 is a perspective view of one of many alternative forms of locking/anti-sliding/anti-adjustment/anti-movement member to the form depicted in FIG. 6.

Referring to FIGS. 4 and 6, each of the two locking/anti-sliding/anti-adjustment/anti-movement members 50 include a central opening 60 for receiving the corresponding fastener 31. Preferably, opening 60 has a diameter just slightly larger than the shaft of the corresponding fastener 31 so that the corresponding fastener cannot move relative to member 50 when fastener 31 extends into opening 60. However, opening 60 can have a diameter which allows movement of corresponding fastener relative to member 50 provided that such movement will not cause the roller guide to assume a change in position relative to the rail of the elevator which is undesirable.

Preferably, member 50, as seen in for example FIG. 6, further includes two sets of openings 62 and 64 extending through member 50. Preferably, the first set of openings 62 and the second set of openings 64 extend parallel or substantially parallel to a longitudinal axis of member 50. Preferably, each opening in the first set of openings 62 are spaced from an adjacent opening equidistant from the spacing between adjacent openings of the set of second openings 64. For example, spacing J and spacing K are each preferably 0.35 inches.

As seen in FIG. 6, the uppermost opening 70 of the first set of openings 62 is disposed closer to a front face 72 of member 50 than the uppermost opening 74 of the second set of openings 64 which creates a vertical or longitudinal offset between each of the openings of the first set of openings 62 and each of the openings in the second set of openings 64. This configuration allows an individual to simply turn over member 50 to provide a different set of optional points that can be utilized to secure member 50 to support member E so that movement of fasteners 31 in the corresponding elongated slot is prevented or substantially reduced. Opening 76 is associated with the first set of openings 62 so that a user can readily distinguish the first set of openings 62 from the second set of openings 64.

Preferably, pins 80 fix the corresponding member 50 to support member E to prevent fasteners 31 from moving in the corresponding elongated slot so that the operational position of roller guide B does not change even if a seismic force or other force generating event is imparted on the adapter assembly A and/or the elevator car as seen in FIGS. 2 to 4. For example, a pin 80 can be inserted into one of the openings of the first set of openings 32 of support E and one of the openings 62 of member 50. Alternatively, a pin 80 can be inserted into one of the openings of the first set of openings 32 and one of the openings 64 merely by flipping member 50 over. Similarly, a pin 80 can be inserted into one of the openings of the second set of openings 34 and one of the openings 62. Alternatively, a pin 80 can be inserted into one of the openings of the second set of openings 34 and one of the openings of the second set of openings 64 merely by flipping member 50 over. Preferably, each of the openings in the set of openings 32, set of openings 34, set of openings 62 and set of openings 64 have the same diameter to receive a cylindrical pin having a constant diameter over the length of the pin. Each of the openings in the set of openings 32 and set of openings 34 extend through support member E. Similarly, each of the openings in the set of openings 62 and set of openings 64 extend through member 50.

Referring to FIGS. 1 to 3, adapter assembly A further preferably includes two lower support members F and G configured to connect upper support member E to frame C of an elevator car. Lower support member F includes threaded bores 92 formed in opposing ends for receiving one of fasteners 31. Lower support member G includes threaded bores 96 formed in opposing ends for receiving one of fasteners 33. Each of lower support members F and G include a pair of elongated slots 98 for receiving a pair of fasteners 100. Elongated slots 98 permit adjustment of each of lower support members F and G relative to frame C.

Lower support member F includes a pair of openings 101 for receiving pins 102 which extend through support member F and a complimentary hole (not shown) formed in frame C to prevent lower support member F from moving relative to the rail of an elevator when a seismic force or other significant force is exerted on assembly A or the elevator car. Similar openings 104 may be formed in lower support member G so that lower support member G and lower support member F are interchangeable as seen in for example FIG. 1.

As is readily evident from the above, the preferred adapter assembly A connects a roller guide to a frame of an elevator car where the hole patterns of these two components are not complimentary while withstanding significant force generating events with very little on site fabrication. For example, in situations where the existing bolt holes formed in frame C can be used the only fabrication necessary is drilling two small holes in frame C to receive pins 102. No alternation or modification of the roller guide is required. The preferred adapter assembly A can withstand an operational force of 2,750 lbf along the X axis and an operational force of 5,550 lbf along the Y axis which extends parallel to the longitudinal axis of elongated slots 28 and 30. The components of adapter assembly A can be formed from any suitable material including any suitable metal.

It should be noted that elongated slots similar to elongated slots 28 and 30, the first set of openings 32 and the second set of openings 34 may be formed in the base of the elevator guide member (e.g., roller guide or slide guide) to allow for adjustment of the guide member relative to the elevator component (e.g., frame of an elevator car or surface of a counterweight) where a complimentary hole pattern does not exist between the hole pattern of the elevator guide member and the hole pattern of the elevator component. For example, base 12 of roller guide B could be made larger and formed with a pair of elongated slots which extend parallel to each other. Openings 20 could be disposed between the elongated slots. More specifically, base 12 of roller guide B could be formed in an identical or substantially identical manner to support member E. In this embodiment, all or one or more of the components (e.g., support member E) of adapter A can be omitted. Alternatively, one or more lower supports F and G can be used with the modified base of roller guide B described above. The locking/anti-sliding/anti-adjustment/anti-movement members 50 and the corresponding components including pins 80 can be employed to prevent movement of any fastener extending though the opposing elongated slots formed directly in the base of the guide member when the elevator guide member is installed in an operational position.

Figure 10:
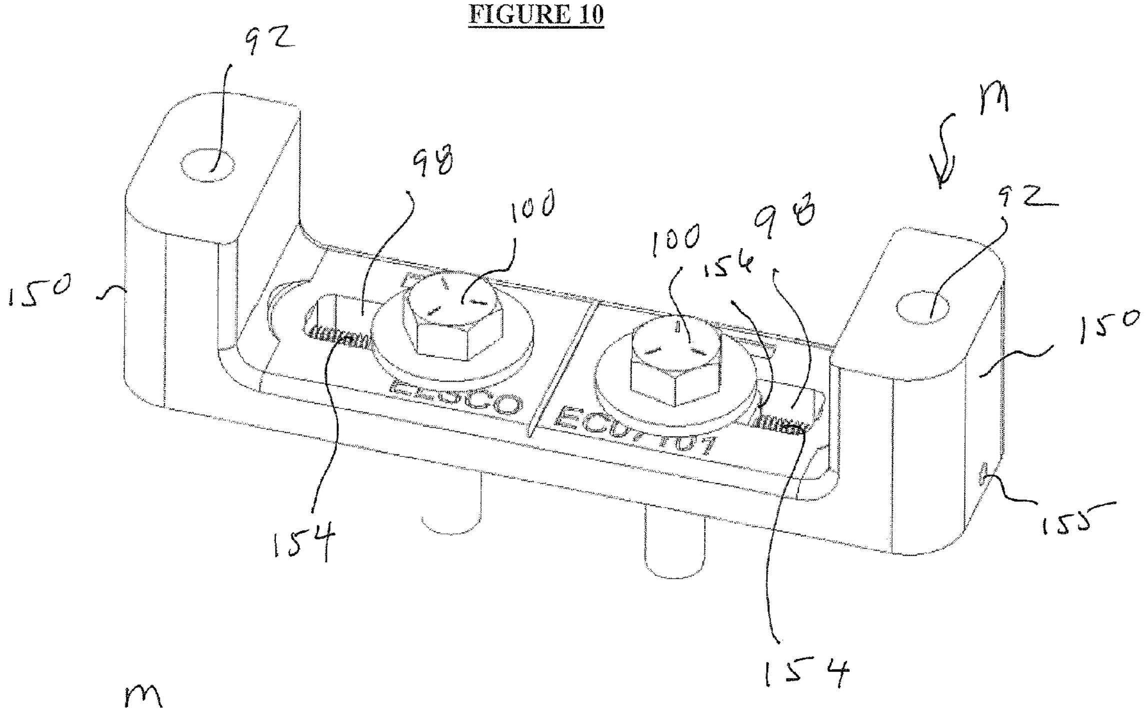
FIG. 10 is a perspective view of an alternative form of lower support of the mounting assembly.
Figure 11:
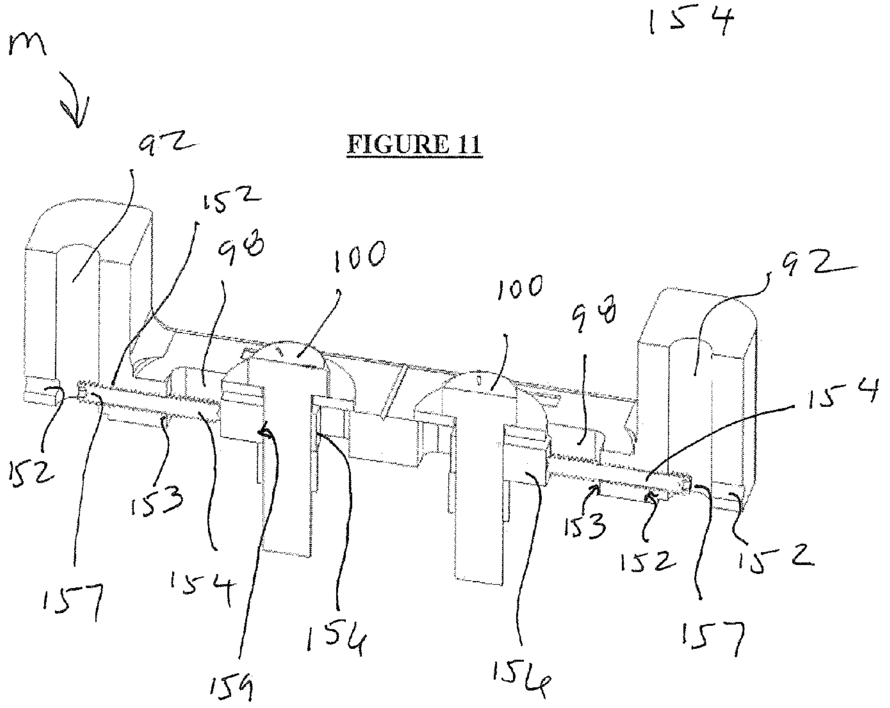
FIG. 11 is a sectional view of the alternative form of lower support of the mounting assembly show in FIG. 10.

Referring to FIGS. 10 and 11, an alternative form of lower support M is illustrated. Lower support M is similar to lower support F and similar elements are provided with the same reference numerals. Lower support member M includes a pair of elongated slots 98 which each receive a fastener 100 to secure support member M to the corresponding elevator component (e.g., counterweight or frame of an elevator car). Support member M further includes a vertically extending threaded bore 92 in each of legs 150 similar to support member F. Unlike support member F, support member M further includes a horizontally extending threaded bore 152 extending through a lower portion of each leg 150 just above a lowermost portion of threaded bore 92. End 153 of the threaded bore 152 terminates in the corresponding elongated slot 98 and opposing end 155 terminates in the outermost surface of the corresponding leg 150. Threaded bores 152 each receive set screws 154. Preferably, the outer end surface of each of set screws 154 has a suitably sized and shaped depression 157 for receiving a tool (e.g., hex key or allen wrench) to turn the set screws 154 clockwise or counterclockwise. Each of the two screws 154 has an inner end that moves inwardly and outwardly depending upon the direction the set screw is turned. Each set screw 154 extends substantially parallel to a longitudinal axis of the corresponding elongated slot 98.

A substantially rectangular shaped body portion 156 is disposed in each elongated slot 98. Each of the two body portions 156 includes a bore 159 extending vertically therethrough for receiving the shaft of the corresponding fastener 100. The position of bore 159 formed in body portion 156 in the corresponding elongated slot 98 may be readily varied merely by sliding body 156 in the corresponding elongated slot 98. Once body portion 156 and corresponding fastener 100 are positioned in a final operating position, set screws 154 are turned so that an inner surface of each set screw directly abuts the corresponding body portion 156, as shown, for example, in FIG. 11. Body portions 156 and set screws 154 prevent the corresponding fastener from sliding in the corresponding elongated slot 98. Hence, in this embodiment, there is no need to drill holes in the elevator component to receive pins 102 that fix lower support member F in a particular position on the elevator component.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for connecting an elevator guide member to an elevator component of an elevator where a hole pattern in the elevator component is different from a hole pattern of the guide member, said apparatus comprising:

(a) a mounting assembly, said mounting assembly being configured to mount a guide member to a component of an elevator, where a hole pattern of the elevator component is different from a hole pattern of the guide member, said mounting assembly including at least one support member, at least one elongated opening and at least one fastener configured to extend through said at least one elongated opening; and, (b) an anti-sliding member connected to said mounting assembly, said anti-sliding member being configured to maintain said at least one fastener in a predetermined operational position in said at least one elongated opening when said mounting assembly and the guide member are mounted in an operational position on the elevator component even when said mounting assembly experiences a predetermined force which would otherwise cause said at least one fastener to slide along a longitudinal axis of said at least one elongated opening wherein at least a portion of said anti-sliding member is disposed in or above said at least one elongated opening.

2. An apparatus as set forth in claim 1, wherein:

(a) said anti-sliding member includes a plate and at least one pin, said plate is disposed above said at least one elongated opening.

3. An apparatus as set forth in claim 1, wherein:

(a) said anti-sliding member includes a plate and at least one pin, said plate includes a first opening extending therethrough for receiving said at least one fastener, said plate further includes a set of second openings extending therethrough, each of said second openings are sized to receive said at least one pin and each of said second openings are smaller than said first opening.

4. An apparatus as set forth in claim 3, wherein:

(a) said plate further includes a set of third openings extending therethrough, each of said third openings are sized to receive said at least one pin and each of said third openings are smaller than said first opening.

5. An apparatus as set forth in claim 4, wherein:

(a) said first opening is disposed between said set of second openings and said set of third openings and each of the third openings have a size equal to each of the second openings; and, (b) said at least one support member includes a first elongated slot and a second elongated slot, said at least one support member includes a set of fourth openings disposed adjacent said first elongated slot, said set of fourth openings are aligned along an axis which extends substantially parallel to a longitudinal axis of said first elongated slot, said at least one support member further includes a set of fifth openings disposed adjacent said second elongated slot, said set of fifth openings are aligned along an axis which extends substantially parallel to a longitudinal axis of said second elongated slot.

6. An apparatus as set forth in claim 5, wherein:

(a) said set of second openings are aligned along a first axis extending from a rear surface of said plate to a front surface of said plate and said set of third openings are aligned along a second axis extending from the rear surface of said plate to the front surface of said plate and wherein said first axis extends parallel to said second axis.

7. An apparatus as set forth in claim 5, wherein:

(a) adjacent second openings are spaced a first distance and adjacent third openings are spaced a second distance wherein said first distance and said second distance are equal and a second opening closest to a front surface of said plate is spaced a third distance from the front surface of said plate and said third opening closest to the front surface of said plate is spaced a fourth distance from the front surface of said plate and wherein the fourth distance is less than the third distance.

8. An adapter assembly for connecting a guide member to a component of an elevator where a hole pattern in the elevator component is different from a hole pattern of the guide member, said adapter assembly comprising:

(a) an adjustable mounting assembly for mounting a guide member on an elevator component in a first operational position, said adjustable mounting assembly being configured to mount the guide member to the elevator component where a hole pattern in the elevator component is different from a hole pattern of the guide member, said mounting assembly including at least one support member having a hole pattern corresponding to a hole pattern formed in a base of a guide member so that the base of the guide member can be secured to said at least one support member using a set of first fasteners extending through the hole pattern in the at least one support member and the hole pattern in the base of the guide member;

(b) a locking member, said locking member when installed in an operational position being configured to maintain said guide member in said first operational position when the elevator experiences a seismic event;

(c) said at least one support member includes a first elongated slot and a set of first openings disposed along said first elongated slot;

(d) a second fastener configured to extend through said first elongated slot; and, (e) said locking member includes a body having a second opening configured to receive said second fastener, said body having a set of third openings offset from said second opening formed in said body, said locking member further includes a securement member configured to secure said body to said at least one support member of said mounting assembly so that said second fastener cannot move in said first elongated slot, said securement member extends into one of said first openings and one of said third openings.

9. An adapter assembly as set forth in claim 8, wherein:

(a) said body has a uniform thickness and is substantially rectangular.

10. An adapter assembly as set forth in claim 8, wherein:

(a) said body has a uniform thickness and is substantially circular.

11. An adapter assembly as set forth in claim 8, wherein:

(a) said securement member is a pin.

12. An adapter assembly as set forth in claim 8, wherein:

(a) said securement member is a cylindrical pin.

13. An adapter assembly for connecting a guide member to a component of an elevator where a hole pattern in the component of the elevator is different from a hole pattern of the guide member, said adapter assembly comprising:

(a) an adjustable mounting assembly for mounting a guide member on a component of an elevator in a first operational position, said adjustable mounting assembly being configured to mount the guide member to the component of the elevator where a hole pattern in the component of the elevator is different from a hole pattern of the guide member, said mounting assembly including at least one upper support member having a hole pattern corresponding to a hole pattern formed in a base of the guide member so that the base of the guide member can be secured to said at least one upper support member using a set of first fasteners extending through the hole pattern in the at least one upper support member and the hole pattern in the base of the guide member, said mounting assembly further including at least one lower support member, the at least one lower support member being configured to connect said at least one upper support member to the component of the elevator; and, (b) a locking member, said locking member when installed in an operational position being configured to prevent movement of said at least one upper member along a first axis when said mounting assembly experiences a predetermined force which would otherwise cause said at least one upper support member to move along the first axis, said locking member being further configured to prevent movement of said at least one lower support member along a second axis when said mounting assembly experiences a predetermined force which would otherwise cause said at least one lower support member to move along the second axis, and wherein the first axis extends perpendicular to said second axis, and wherein at least a portion of said locking member is disposed above said at least one upper support member.

14. An adapter assembly for connecting a guide member to a component of an elevator where a hole pattern in the component of the elevator is different from a hole pattern of the guide member, said adapter assembly comprising:

(a) an adjustable mounting assembly for mounting a guide member on a component of an elevator in a first operational position, said adjustable mounting assembly being configured to mount the guide member to the component of the elevator where a hole pattern in the component of the elevator is different from a hole pattern of the guide member, said mounting assembly including at least one upper support member having a hole pattern corresponding to a hole pattern formed in a base of the guide member so that the base of the guide member can be secured to said at least one upper support member using a set of first fasteners extending through the hole pattern in the at least one upper support member and the hole pattern in the base of the guide member, said mounting assembly further including at least one lower support member, the at least one lower support member being configured to connect said at least one upper support member to the component of the elevator;

(b) a locking member, said locking member when installed in an operational position being configured to prevent movement of said at least one upper member along a first axis when said mounting assembly experiences a predetermined force which would otherwise cause said at least one upper support member to move along the first axis, said locking member being further configured to prevent movement of said at least one lower support member along a second axis when said mounting assembly experiences a predetermined force which would otherwise cause said at least one lower support member to move along the second axis, and wherein the first axis extends perpendicular to said second axis; and, (c) said at least one upper support member includes an elongated slot and a set of second openings disposed along said elongated slot, said at least one lower support member includes an elongated slot and a third opening offset from said elongated slot formed in said lower support member, a second fastener configured to extend through said elongated slot of said at least one upper support member to attach said at least one upper support member to said at least one lower support member, and a third fastener configured to extend through said elongated slot of said at least one lower support member to attach said at least one lower support member to the component of the elevator.

15. An adapter assembly as set forth in claim 14, wherein:

(a) said locking member includes a body having a fourth opening configured to receive said second fastener, said body having a set of fifth openings offset from said fourth opening formed in said body, said locking member further includes a first securement member configured to secure said body to said at least one upper support member of said mounting assembly so that said second fastener cannot move in said elongated slot of said at least one upper support member, said first securement member extends into one of said second openings and one of said fifth openings and said locking member further includes a second securement member that extends into said third opening and an opening formed in the component of the elevator so that said third fastener cannot move in said elongated slot of said at least one lower support member.

16. An adapter assembly as set forth in claim 14, wherein:

(a) said locking member includes a body having a fourth opening configured to receive said second fastener, said body includes a set of fifth openings and a set of sixth openings, said fourth opening being disposed between said set of fifth openings and said set of sixth openings.

17. An adapter assembly as set forth in claim 16, wherein:

(a) each of said fifth openings and each of said sixth openings are the same size.

18. An adapter assembly as set forth in claim 16, wherein:

(a) a fifth opening closet to a front face of said body of said locking member is spaced a first distance from said front face of said body of said locking member and a sixth opening closet to a front face of said body of said locking member is spaced a second distance from said front face of said body of said locking member and wherein said first distance is less than said second distance, adjacent fifth openings are spaced a distance from each other equal to the distance adjacent sixth openings are spaced from each other.

19. An adapter assembly as set forth in claim 16, wherein:

(a) said body includes identifying means for identifying to a user the difference between the set of fifth openings and the set of sixth openings; and, (b) said at least one upper support member includes positioning indicia to identify an optimal position of the guide member relative to a rail of the elevator.

20. An apparatus for connecting an elevator guide member to an elevator component where a hole pattern in the elevator component is different from a hole pattern of the guide member, said apparatus comprising:

(a) at least one elongated slot formed in one of a base of a guide member and a support member, said at least one elongated slot being configured to allow a position of said guide member to be adjusted relative to the elevator component to allow the base of the guide member to be connected to the elevator component where a hole pattern in the elevator component is different from a hole pattern formed in the base of the guide member;

(b) a first set of openings being disposed along said at least one elongated slot; and, (c) an anti-sliding member being configured to maintain at least one fastener disposed in said at least one elongated slot in a predetermined operational position in said at least one elongated slot when the guide member is installed on an elevator component even when an elevator is subject to a force which would otherwise cause said at least one fastener to slide along a longitudinal axis of said at least one elongated slot by utilizing at least one of said first set of openings disposed along said at least one elongated slot.

21. An apparatus for connecting an elevator guide member to an elevator component where a hole pattern in the elevator component is different from a hole pattern of the guide member, said apparatus comprising:

(a) at least one elongated slot formed in one of a base of a guide member and a support member, said at least one elongated slot being configured to allow a position of said guide member to be adjusted relative to the elevator component to allow the base of the guide member to be connected to the elevator component where a hole pattern in the elevator component is different from a hole pattern formed in the base of the guide member; and, (b) an anti-sliding member being configured to maintain at least one fastener disposed in said at least one elongated slot in a predetermined operational position in said at least one elongated slot when the guide member is installed on an elevator component even when an elevator is subject to a force which would otherwise cause said at least one fastener to slide along a longitudinal axis of said at least one elongated slot wherein at least a portion of said anti-sliding member is: (i) disposed in said at least one elongated slot; (ii) disposed above said at least one elongated slot; or (iii) extends into the one of a base of a guide member and a support member having the at least one elongated slot.

* * * * *